United States Patent
Lee et al.

(10) Patent No.: US 11,498,167 B2
(45) Date of Patent: Nov. 15, 2022

(54) AUTOMATIC NUT SCREWING DEVICE

(71) Applicant: SUMEEKO INDUSTRIES CO., LTD., Kaohsiung (TW)

(72) Inventors: Hsin Wei Lee, Kaohsiung (TW); Kuang Yu Chen, Kaohsiung (TW); Shen Fu Wu, Kaohsiung (TW); Ming Yuan Chen, Kaohsiung (TW)

(73) Assignee: SUMEEKO INDUSTRIES CO., LTD., Kaohsiung (TW)

( * ) Notice: Subject to any disclaimer, the term of this patent is extended or adjusted under 35 U.S.C. 154(b) by 74 days.

(21) Appl. No.: 17/129,663

(22) Filed: Dec. 21, 2020

(65) Prior Publication Data

US 2022/0168856 A1  Jun. 2, 2022

(30) Foreign Application Priority Data

Nov. 27, 2020 (TW) .................................. 109215668

(51) Int. Cl.
*B23P 19/06* (2006.01)
(52) U.S. Cl.
CPC ....... *B23P 19/065* (2013.01); *Y10T 29/53417* (2015.01)
(58) Field of Classification Search
CPC ............. B23P 19/065; Y10T 29/53478; Y10T 29/53417; Y10T 29/49766
See application file for complete search history.

(56) References Cited

U.S. PATENT DOCUMENTS

| 8,904,615 B2 * | 12/2014 | Ohno | B23P 19/06 |
| | | | 81/57.23 |
| 2020/0001412 A1 * | 1/2020 | Miyake | B25B 23/06 |

FOREIGN PATENT DOCUMENTS

| FR | 0362013 A2 * | 4/1990 | B23P 19/06 |
| KR | 100942177 B1 * | 9/2009 | B29C 45/14008 |

* cited by examiner

*Primary Examiner* — Sarang Afzali
(74) *Attorney, Agent, or Firm* — Maschoff Brennan

(57) ABSTRACT

An automatic nut screwing device includes a positioning mold plate, a screw shaft, driving gear elements having driving gears, and transmission screwing elements having transmission screw gear units, bolt heads and bolt bodies. The transmission screw gear unit engages an upper out surface of the bolt head. The bolt head of each transmission screw element is fixed with the positioning mold plate. The shaft engaging portion engages with the transmission screw gear unit. The transmission screw gear unit engages with the driving gears such that the transmission screw gear unit is driven to rotate by the shaft engaging portion. A nut socket placing element has nut sockets when the screw shaft is axially rotated to enable the shaft engaging portion of the screw shaft to drive the transmission screw elements, thereby successively rotating elements that result in screw body being rotated to screw with the nut.

7 Claims, 4 Drawing Sheets

AUTOMATIC NUT SCREWING DEVICE

FIELD OF THE INVENTION

The present invention relates to a screwing device, and more particularly relates to an automatic nut screwing device for tightly screwing a nut.

BACKGROUND OF THE INVENTION

In a conventional process for manufacturing a sealing nut, a bolt and a nut are screwed with each other, and then the screwed bolt and nut are subjected to an insert molding process. However, the conventional process can only screw one nut with one bolt each time, but cannot simultaneously screw a plurality of nuts and bolts each time. It thus has drawbacks of time-consuming and inefficiency. Therefore, the conventional process for manufacturing the sealing nut needs to be improved.

SUMMARY OF THE INVENTION

Accordingly, one objective of the present invention is to provide an automatic nut screwing device for tightly screwing a nut, which can simultaneously screw a plurality of bolts and nuts in one single step so as to shorten the manufacturing time and improve the production efficiency.

In order to achieve the above objective, the present invention provides an automatic nut screwing device, comprising: a positioning mold plate having a plurality of positioning holes, the plurality of positioning holes penetrating through the positioning mold plate; a screw shaft having a shaft engaging portion, the screw shaft being axially rotatable by applying a force thereto; a plurality of driving gear elements, each driving gear element being disposed on a top surface of the positioning mold plate, and each driving gear element having driving gears; a plurality of transmission screwing elements, each transmission screwing element having a transmission screw gear unit, a bolt head and a bolt body, the transmission screw gear unit being provided to engage to an upper out surface of the bolt head, the positioning hole being fixed with a lower out surface of the bolt head, a screw thread being provided on an out surface of the bolt body, the bolt head of each transmission screw element being fixed with the positioning mold plate, the shaft engaging portion engaging with the transmission screw gear unit and the transmission screw gear unit being engaged with the driving gears such that the transmission screw gear unit is driven to rotate by the shaft engaging portion, the screw thread being located below the positioning mold plate and extending downward, and the transmission screw gear unit being provided with a torque limiter; and a nut socket placing element separable from the positioning mold plate, the nut socket placing element being provided with a plurality of nut sockets, the nut socket placing element being located below the positioning mold plate in a manner that each nut socket corresponds to one of the transmission screw element, a plurality of nuts being stacked and stored in one nut socket, a shape of thread of each nut being corresponding to the screw thread shape of the screw body so as to screw the nuts to the bolt bodies, wherein when the screw shaft is axially rotated to enable the shaft engaging portion of the screw shaft to drive the transmission screw elements to rotate the transmission screw elements to drive the driving gear elements to drive the transmission screw elements to rotate the screw body such that the screw body are rotated to screw with the nut.

In one embodiment of the present invention, the automatic nut screwing device is provided, wherein the torque limiter is located at a bottom side of the transmission screw gear unit, the torque limiter being provided to enable to release a force applying to the bolt body, which has been engaged with the nut, to stop a relative rotation between the nut and the screw thread of the bolt body.

In one embodiment of the present invention, the automatic nut screwing device is provided, wherein the nuts placed in the nut socket is classified as a ready-to-be-screwed nut and a pre-placed nut, the bolt body is screwed with the ready-to-be-screwed nut, and the pre-placed nut is disposed under the ready-to-be-screwed nut in a manner that the pre-placed nut abuts against a bottom end of the ready-to-be-screwed nut.

In one embodiment of the present invention, the automatic nut screwing device further comprises a positioning block assembly is provided, wherein a holding board assembly is further placed between the positioning mold plate and the nut socket placing element, the holding board assembly having two holding boards, the positioning block assembly having a top positioning block set and a surrounding positioning block set, the top positioning block set being disposed in a position between the two holding boards to abut against the nut, and the surrounding positioning block set being provided below the holding board assembly to abut against the nut.

In one embodiment of the present invention, the automatic nut screwing device is provided, wherein the top positioning block set having two upper positioning blocks, which are respectively abut against upper opposite sides of the nut, and the surrounding positioning block set having two side positioning blocks, which are disposed on a top surface of the nut socket placing element and respectively abut against two opposite sides of an out surface of the nut.

In one embodiment of the present invention, the automatic nut screwing device is provided, wherein the nut socket placing element includes a spring and a positioning pillar, the spring is placed around the positioning pillar, the positioning pillar protrudes from a bottom of the nut socket placing element in a manner that the positioning pillar corresponds to the positioning hole of the positioning mold plate.

In one embodiment of the present invention, the automatic nut screwing device is provided, wherein the positioning pillar passes through the nuts to stack the nuts such that the nuts are positioned within the positioning pillar.

The automatic nut screwing device of the present invention has the technical effects as follows. A large amount of nuts and bolts can be simultaneously screwed with each other in one step of operation to increase the productivity of the sealing nut and improve the production efficiency.

Specific embodiments disclosed by the present invention are further described by embodiments disclosed as below and the accompanying drawings.

DETAILED DESCRIPTION OF THE PREFERRED EMBODIMENTS

Figure 1A:
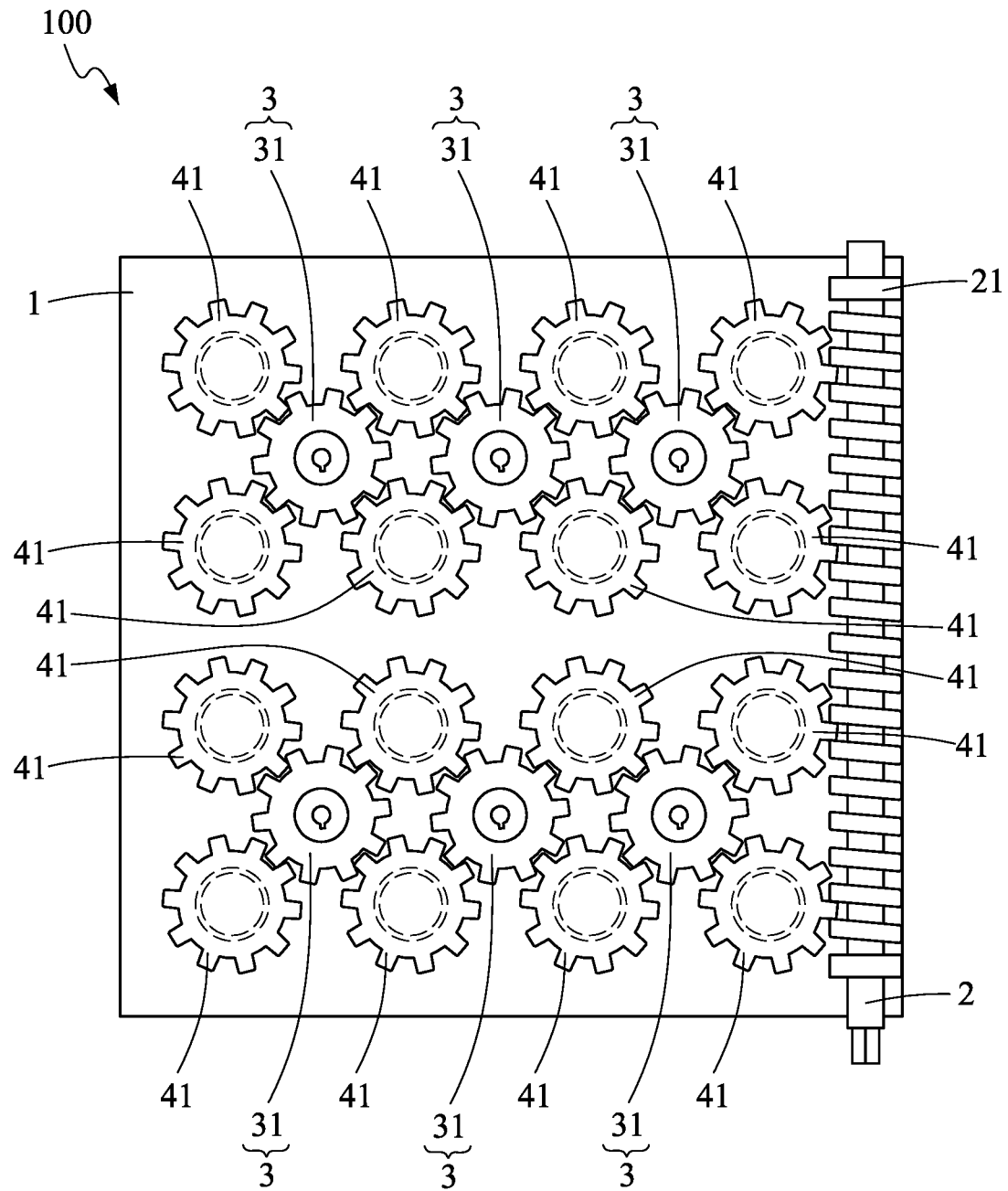
FIG. 1A is a schematic top view illustrating an automatic nut screwing device according to one embodiment of the present invention.

The preferred embodiments of the present invention are described in detail with reference to FIGS. 1A to 3. The description is used for explaining the embodiments of the present invention only, but not for limiting the scope of the claims.

As shown in FIGS. 1A to 2B, according to one embodiment of the present invention, an automatic nut screwing device 100 comprises: a positioning mold plate 1 having a plurality of positioning holes, the plurality of positioning holes penetrating through the positioning mold plate 1; a screw shaft 2 having a shaft engaging portion 21, the screw shaft 2 being axially rotatable by applying a force thereto; a plurality of driving gear elements 3, each driving gear element 3 being disposed on a top surface of the positioning mold plate 1 (the term "disposed on" here means that the driving gear element 3 is rotatably mounted on the top surface of the positioning mold plate 1), and each driving gear element 3 having a driving gear 31; a plurality of transmission screwing elements 4, each transmission screwing element 4 having a transmission screw gear unit 41, a bolt head 42 and a bolt body 43, the transmission screw gear unit 41 being provided to engage to an upper out surface of the bolt head 42, the positioning hole being fixed with a lower out surface of the bolt head 42, a screw thread 44 being provided on an out surface of the bolt body 43, the bolt head 42 of each transmission screw element 4 being fixed with the positioning mold plate 1 (the term "fixed with" here means that the transmission screw element 4 is rotatably mounted on the positioning mold plate 1), the shaft engaging portion 21 engaging with the transmission screw gear unit 41 and the transmission screw gear unit 41 being engaged with the driving gears 31 such that the transmission screw gear unit 41 is driven to rotate by the shaft engaging portion 21, the screw thread 44 being located below the positioning mold plate 1 and extending downward, and the transmission screw gear unit 41 being provided with a torque limiter 45; and a nut socket placing element 5 separable from the positioning mold plate 1, the nut socket placing element 5 being provided with a plurality of nut sockets 51, the nut socket placing element 5 being located below the positioning mold plate 1 in a manner that each nut socket 51 corresponds to one of the transmission screw element 4, a plurality of nuts 6 being stacked and stored in one nut socket 51, a shape of thread 61 of each nut 6 being corresponding to the screw thread shape of the screw body 43 so as to screw the nuts 6 to the bolt bodies 43, wherein when the screw shaft 2 is axially rotated to enable the shaft engaging portion 21 of the screw shaft 2 to drive the transmission screw elements 4 to rotate the transmission screw elements 4 to drive the driving gear elements 3 to drive the transmission screw elements 4 to rotate the screw body 43 such that the screw body 43 are rotated to screw with the nut 6.

In detail, in the embodiment of the present invention, the force applied to the screw shaft 2 is produced by a pneumatic tool, such as a pneumatic driver or a pneumatic spanner, which drives the screw shaft 2 to rotate. However, the present invention is not limited to this, and any kind of devices can be used for producing the applied force to drive the screw shaft 2 to rotate, for example, an electric screwdriver or an electric wrench.

As shown in FIG. 1A, each driving gear 31 is engaged with the transmission screw gear units 41. Specifically, some of the transmission screw gear units 41 are engaged with the shaft engaging portion 21 and the driving gear 31. When the pneumatic tool drives the screw shaft 2 to rotate, the shaft engaging portion 21 of the screw shaft 2 axially rotates to drive some of transmission screw gear units 41 to rotate such that each driving gear 31 engaged with the transmission screw gear units 41 rotates. Furthermore, each driving gear 31 rotates to drive the transmission screw gear units 41 engaged with the driving gear 31.

Figure 2A:
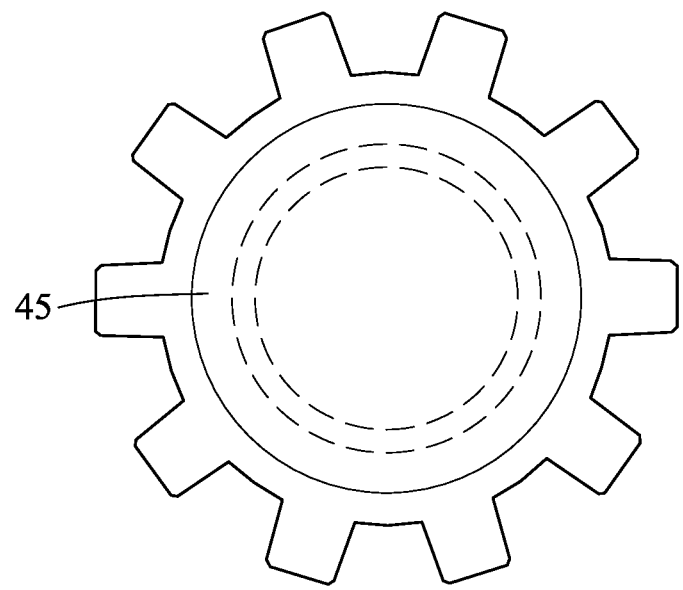
FIG. 2A is a schematic top view illustrating a transmission screwing element of the automatic nut screwing device according to the embodiment of the present invention.
Figure 2B:
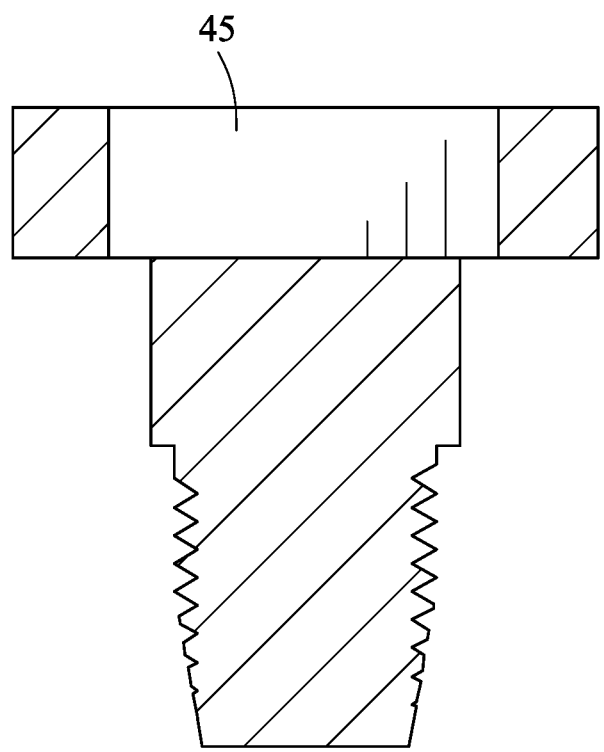
FIG. 2B is a schematic side view illustrating the transmission screwing element of the automatic nut screwing device according to the embodiment of the present invention.

As shown in FIGS. 2A to 2B, in the automatic nut screwing device 100 according to the embodiment of the present invention, the torque limiter 45, such as a torque limiter for a torque wrench, is located at a bottom side of the transmission screw gear unit 41. The torque limiter 45 is provided to enable to release a force applying to the bolt body 43, which has been engaged with the nut 6, to stop a relative rotation between the nut 6 and the screw thread of the bolt body 43 such that the screw thread 44 does not rotate with respect to the nut 6.

As shown in FIGS. 2A to 2B, the transmission screw gear unit 41 of each transmission screwing element 4 is engaged with the bolt head 42 via the torque limiter 45. When the transmission screwing element 4 rotates, each bolt body 43 is screwed with each nut 6. When each bolt body 43 has been engaged with the nut 6 (that is, the bolt body 43 and the nut 6 are screwed together to achieve a predetermined tightening torque), the torque limiter 45 separates the transmission screw gear unit 41 from the bolt head 42 such that the bolt body 43 screwed with the nut 6 does not rotate.

Figure 1B:
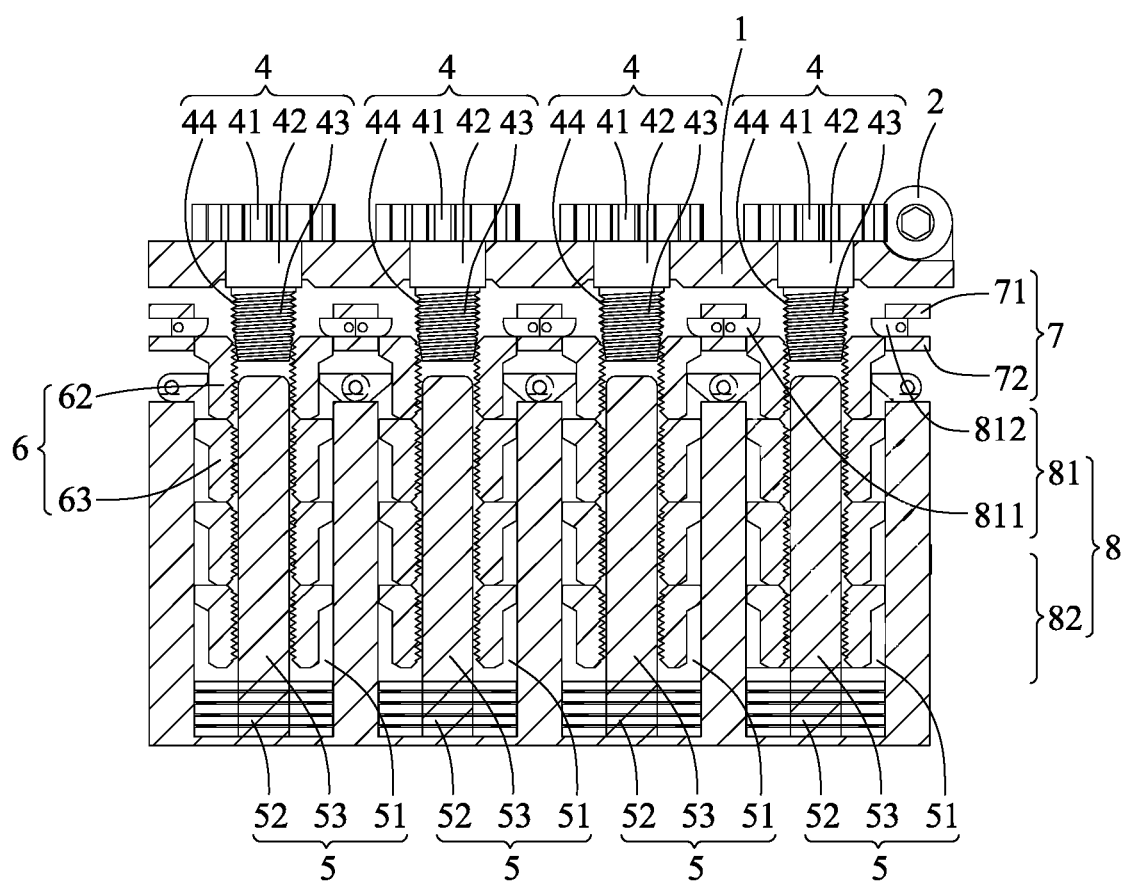
FIG. 1B is a schematic side view illustrating the automatic nut screwing device according to the embodiment of the present invention.

As shown in FIG. 1B, in the automatic nut screwing device 100 according to the embodiment of the present invention, the nuts 6 placed in the nut socket 51 is classified as a ready-to-be-screwed nut 62 and a pre-placed nut 63. The bolt body 43 is screwed with the ready-to-be-screwed nut 62, and the pre-placed nut 63 is disposed under the ready-to-be-screwed nut 62 in a manner that the pre-placed nut 63 abuts against a bottom end of the ready-to-be-screwed nut 62.

In detail, the bolt head 42 and the bolt body 43 are constituted as a bolt, and each bolt body 43 is engaged with the ready-to-be-screwed nut 62, wherein the bolt body 43 rotates to screw with the ready-to-be-screwed nut 62. Then, the screwed bolt and the ready-to-be-screwed nut 62 are taken out together with the positioning mold plate 1 and are subjected to an insert molding process. Meanwhile, because the bolt, the ready-to-be-screwed nut 62 and the positioning mold plate 1 have been taken out, the pre-placed nuts 63 disposed under the ready-to-be-screwed nut 62 in a manner that the pre-placed nut 63 abuts against a bottom end of the ready-to-be-screwed nut 62 are pushed to be a substitute such that the pre-placed nut 63 becomes a new ready-to-be-screwed nut.

Figure 3:
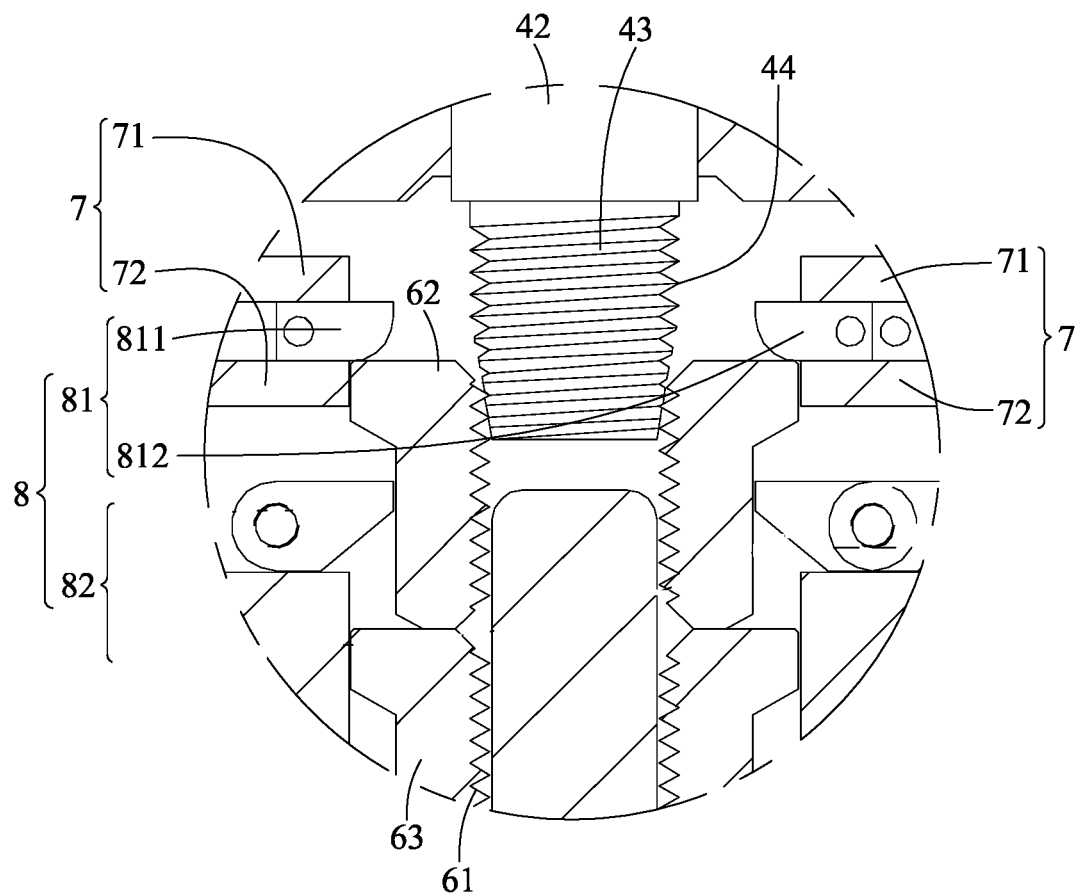
FIG. 3 is a schematic partial enlarged view illustrating a holding board assembly and a nut socket placing element of the automatic nut screwing device according to the embodiment of the present invention.

As shown in FIGS. 1B and 3, in the automatic nut screwing device 100 according to the embodiment of the present invention, the automatic nut screwing device 100 further comprises a positioning block assembly 8, wherein a holding board assembly 7 is further placed between the positioning mold plate 1 and the nut socket placing element 5, the holding board assembly 7 having two holding boards which respectively are the holding board 71 and the holding board 72. The positioning block assembly 8 has a top positioning block set 81 and a surrounding positioning block set 82. The top positioning block set 81 is disposed in a position between the two holding boards 71, 72 to abut against the nut 6, and the surrounding positioning block set 82 is provided below the holding board assembly 7 to abut against the nut 6.

As shown in FIGS. 1B and 3, in the automatic nut screwing device 100 according to the embodiment of the present invention, the top positioning block set 81 has two upper positioning blocks that are the upper positioning block 811 and the upper positioning block 812, which are respectively abut against upper opposite sides of the nut 6. Moreover, the surrounding positioning block set 82 has two side positioning blocks that are the side positioning block 811 and the side positioning block 812, which are disposed on a top surface of the nut socket placing element 5 and respectively abut against two opposite sides of an out surface of the nut 6.

In detail, the top positioning block set 81 is slidable, and the top positioning block set 81 is used for fixing the ready-to-be-screwed nut 62. When the bolt body 43 and the ready-to-be-screwed nut 62 are screwed with each other, the top positioning block set 81 can be slid such that the bolt and the ready-to-be-screwed nut 62 which are screwed with each other are easily taken out from the automatic nut screwing device 100.

Furthermore, when the bolt body 43 is being screwed to the ready-to-be-screwed nut 62, the surrounding positioning block set 82 can prevent the ready-to-be-screwed nut 62 from rotating and moving together with the bolt body 43 in a horizontal direction.

As shown FIG. 1B, in the automatic nut screwing device 100 according to the embodiment of the present invention, the nut socket placing element 5 includes a spring 52 and a positioning pillar 53 which are located below each nut socket 51. The spring 52 is placed around the positioning pillar 53, and the positioning pillar 53 protrudes from a bottom of the nut socket 51 in a manner that the positioning pillar 53 corresponds to the positioning hole of the positioning mold plate 1.

In detail, the positioning pillar 53 is configured to assist the nut 6 to accurately arrange into the nut socket 51.

As shown in FIG. 1B, in the automatic nut screwing device 100 according to the embodiment of the present invention, the positioning pillar 53 passes through the nuts 6 to stack the nuts 6 such that the nuts 6 are positioned within the positioning pillar 53.

In detail, when the nuts 6 are pre-placed in the nut socket 51, the spring 52 placed around the positioning pillar 53 is compressed by the nuts 6. Moreover, when the ready-to-be-screwed nut 62, the bolt and the positioning mold plate 1 are taken out together, the spring 52 pushes the pre-placed nut 63 to move toward the positioning mold plate 1 such that the pre-placed nuts 63 abutting against the bottom end of the ready-to-be-screwed nut 62 are pushed to be a substitute and become a new ready-to-be-screwed nut.

Moreover, after the ready-to-be-screwed nut 62 and the bolt have been subjected to the insert molding process, the processed ready-to-be-screwed nut 62 (that is, the nut having a nylon ring), the bolt and the positioning mold plate 1 are disposed on the nut socket placing element 5. Furthermore, the bolt and the nut 6 are rotated in opposite directions such that the nut 6 is loosened from the bolt to obtain a sealing nut.

With the technical means adopted by the present invention, a large amount of nuts 6 and bolts can be simultaneously screwed with each other in one step of operation to increase the productivity of the sealing nut and improve the production efficiency.

The above description is only an explanation of the preferred embodiment of the present invention. One having ordinary skill in the art can make various modifications according to the claims below and the above description. However, the modifications shall still belong to the technical concept of the present invention and fall within the scope of the present invention.

What is claimed is:

1. An automatic nut screwing device, comprising:

a positioning mold plate having a plurality of positioning holes, the plurality of positioning holes penetrating through the positioning mold plate;

a screw shaft having a shaft engaging portion, the screw shaft being axially rotatable by applying a force thereto;

a plurality of driving gear elements, each driving gear element being disposed on a top surface of the positioning mold plate, and each driving gear element having driving gears;

a plurality of transmission screwing elements, each transmission screwing element having a transmission screw gear unit, a bolt head and a bolt body, the transmission screw gear unit being provided to engage to an upper out surface of the bolt head, the positioning hole being fixed with a lower out surface of the bolt head, a screw thread being provided on an out surface of the bolt body, the bolt head of each transmission screw element being fixed with the positioning mold plate, the shaft engaging portion engaging with the transmission screw gear unit and the transmission screw gear unit being engaged with the driving gears such that the transmission screw gear unit is driven to rotate by the shaft engaging portion, the screw thread being located below the positioning mold plate and extending downward, and the transmission screw gear unit being provided with a torque limiter; and a nut socket placing element separable from the positioning mold plate, the nut socket placing element being provided with a plurality of nut sockets, the nut socket placing element being located below the positioning mold plate in a manner that each nut socket corresponds to one of the transmission screw element, a plurality of nuts being stacked and stored in one nut socket, a shape of thread of each nut being corresponding to the screw thread shape of the screw body so as to screw the nuts to the bolt bodies, wherein when the screw shaft is axially rotated to enable the shaft engaging portion of the screw shaft to drive the transmission screw elements to rotate the transmission screw elements to drive the driving gear elements to drive the transmission screw elements to rotate the screw body such that the screw body are rotated to screw with the nut.

2. The automatic nut screwing device as claimed in claim 1, further comprising a positioning block assembly, wherein a holding board assembly is further placed between the positioning mold plate and the nut socket placing element, the holding board assembly having two holding boards, the positioning block assembly having a top positioning block set and a surrounding positioning block set, the top positioning block set being disposed in a position between the two holding boards to abut against the nut, and the surrounding positioning block set being provided below the holding board assembly to abut against the nut.

3. The automatic nut screwing device as claimed in claim 2, wherein the top positioning block set having two upper positioning blocks, which are respectively abut against upper opposite sides of the nut, and the surrounding positioning block set having two side positioning blocks, which are disposed on a top surface of the nut socket placing element and respectively abut against two opposite sides of an out surface of the nut.

4. The automatic nut screwing device as claimed in claim 1, wherein the nut socket placing element includes a spring and a positioning pillar, the spring is placed around the positioning pillar, the positioning pillar protrudes from a bottom of the nut socket placing element in a manner that the positioning pillar corresponds to the positioning hole of the positioning mold plate.

5. The automatic nut screwing device as claimed in claim 4, wherein the positioning pillar passes through the nuts to stack the nuts such that the nuts are positioned within the positioning pillar.

6. The automatic nut screwing device as claimed in claim 1, wherein the torque limiter is located at a bottom side of the transmission screw gear unit, the torque limiter being provided to enable to release a force applying to the bolt body, which has been engaged with the nut, to stop a relative rotation between the nut and the screw thread of the bolt body.

7. The automatic nut screwing device as claimed in claim 1, wherein the nuts placed in the nut socket is classified as a ready-to-be-screwed nut and a pre-placed nut, the bolt body is screwed with the ready-to-be-screwed nut, and the pre-placed nut is disposed under the ready-to-be-screwed nut in a manner that the pre-placed nut abuts against a bottom end of the ready-to-be-screwed nut.

\* \* \* \* \*